United States Patent
Natarajan et al.

(10) Patent No.: US 10,491,632 B1
(45) Date of Patent: Nov. 26, 2019

(54) METHODS FOR REDUCING COMPLIANCE VIOLATIONS IN MOBILE APPLICATION MANAGEMENT ENVIRONMENTS AND DEVICES THEREOF

(71) Applicant: F5 Networks, Inc., Seattle, WA (US)

(72) Inventors: Ravi Natarajan, Fremont, CA (US); Bipin Kumar, San Ramon, CA (US)

(73) Assignee: F5 Networks, Inc., Seattle, WA (US)

( * ) Notice: Subject to any disclaimer, the term of this patent is extended or adjusted under 35 U.S.C. 154(b) by 176 days.

(21) Appl. No.: 15/411,693

(22) Filed: Jan. 20, 2017

Related U.S. Application Data

(60) Provisional application No. 62/281,502, filed on Jan. 21, 2016.

(51) Int. Cl.
*H04L 29/06* (2006.01)
*H04W 4/12* (2009.01)
*H04W 12/08* (2009.01)
*H04W 88/02* (2009.01)

(52) U.S. Cl.
CPC .............. *H04L 63/20* (2013.01); *H04L 63/10* (2013.01); *H04W 4/12* (2013.01); *H04W 12/08* (2013.01); *H04W 88/02* (2013.01)

(58) Field of Classification Search
CPC .......... H04L 63/10; H04L 63/20; H04W 4/12; H04W 12/08
USPC ........................................................... 726/1
See application file for complete search history.

(56) References Cited

U.S. PATENT DOCUMENTS

| | | | |
|---|---|---|---|
| 6,892,309 B2 * | 5/2005 | Richmond | H04L 63/0218 709/223 |
| 9,049,172 B2 * | 6/2015 | Dargis | H04L 63/0272 |
| 9,143,379 B1 * | 9/2015 | Berger | H04L 29/00 |
| 9,721,112 B2 * | 8/2017 | Tse | G06F 21/6218 |
| 2007/0143851 A1 * | 6/2007 | Nicodemus | G06F 11/3495 726/25 |
| 2007/0195779 A1 * | 8/2007 | Judge | H04L 47/10 370/392 |

(Continued)

OTHER PUBLICATIONS

Big-IP® Access Policy Manager®: Implementations, Version 12.0, F5 Networks, Inc., 2015, pp. 1-108.

(Continued)

*Primary Examiner* — Samson B Lemma
(74) *Attorney, Agent, or Firm* — Pepper Hamilton LLP

(57) ABSTRACT

Methods, non-transitory computer readable media, compliance management apparatuses, and network traffic management systems that execute a compliance check to determine when a mobile device is out of compliance. A number of mobile devices that both are out of compliance based on the violation and share a characteristic with the one mobile device is determined, when the determining indicates that the mobile device is out of compliance. A determination is made when the number of the mobile devices exceeds a threshold. Contact data associated with one or more mobile devices that are in compliance and share the characteristic is obtained, when the determining indicates that the number of mobile devices exceeds the threshold. A notification is automatically sent, using the contact data, to each of the mobile devices that share the characteristic. The notification comprises an indication of the violation and one or more precautions.

25 Claims, 5 Drawing Sheets

(56) References Cited

U.S. PATENT DOCUMENTS

| | | | |
|---|---|---|---|
| 2008/0108405 A1* | 5/2008 | Brosnan | G07F 17/32 463/16 |
| 2011/0119517 A1* | 5/2011 | Beeco | H04L 41/0677 713/340 |
| 2014/0173687 A1* | 6/2014 | Dimitrakos | G06F 21/6245 726/1 |
| 2016/0088021 A1* | 3/2016 | Jayanti Venkata | G06F 8/60 726/1 |
| 2016/0092685 A1* | 3/2016 | Tse | G02F 21/6218 726/1 |
| 2017/0374061 A1* | 12/2017 | Jayanti Venkata | G06F 8/60 |
| 2018/0124060 A1* | 5/2018 | Dildilian | H04W 4/08 |
| 2018/0174189 A1* | 6/2018 | Joseph | H04W 4/21 |

OTHER PUBLICATIONS

BIG-IP® Analytics: Implementations, version 12.0, Sep. 1, 2015, F5 Networks, Inc., pp. 1-50.

Big-IP® Application Security Manager™: Implementations, Version 12.0, F5 Networks, Inc., 2015-2016, pp. 1-352.

F5 Networks, Inc., "BIG-IP APM", Release Notes, Aug. 9, 2016, pp. 1-9, version 11.6.1, F5 Networks, Inc.

F5 Networks, Inc., "BIG-IP APM 11.4.1", Release Notes, Nov. 7, 2014, Version 11.4.1.

F5 Networks, Inc., "BIG-IP® Access Policy Manager® Authentication Configuration Guide", Manual, Sep. 17, 2013, pp. 1-201, Version 11.4.

F5 Networks, Inc., "BIG-IP® Access Policy Manager®: Application Access Guide", Manual, Jun. 11, 2013, pp. 1-26, Version 11.4.

F5 Networks, Inc., "BIG-IP® Access Policy Manager®: Application Access", Manual, Aug. 25, 2014, pp. 1-50, version 11.6, F5 Networks, Inc.

F5 Networks, Inc., "BIG-IP® Access Policy Manager®: Authentication and Single Sign-On", Manual, Aug. 25, 2014, pp. 1-308, version 11.6, F5 Networks, Inc.

F5 Networks, Inc., "BIG-IP® Access Policy Manager®: Edge Client® and Application Configuration", Manual, Aug. 25, 2014, pp. 1-66, version 11.6, F5 Networks, Inc.

F5 Networks, Inc., "BIG-IP® Access Policy Manager®: Implementations", Manual, Aug. 25, 2014, pp. 1-98, version 11.6, F5 Networks, Inc.

F5 Networks, Inc., "BIG-IP® Access Policy Manager®: Secure Web Gateway Implementations", Manual, Aug. 25, 2014, pp. 1-160, version 11.6, F5 Networks, Inc.

F5 Networks, Inc., "Configuration Guide for BIG-IP® Access Policy Manager®", Manual, Sep. 30, 2013, pp. 1-369, Version 11.4.

F5 Networks, Inc., "F5 BIG-IP Access Policy Management Operations Guide", Manual, May 5, 2015, pp. 1-168.

F5 Networks, Inc., "F5 BIG-IP Access Policy Management Operations Guide", Manual, May 5, 2015, pp. 1-168, F5 Networks, Inc.

* cited by examiner

METHODS FOR REDUCING COMPLIANCE VIOLATIONS IN MOBILE APPLICATION MANAGEMENT ENVIRONMENTS AND DEVICES THEREOF

This application claims the benefit of U.S. Provisional Patent Application Ser. No. 62/281,502, filed on Jan. 21, 2016, which is hereby incorporated by reference in its entirety.

FIELD

This technology generally relates to mobile application management environments and, more particularly, to methods and devices for reducing compliance violations in mobile application management environments.

BACKGROUND

Increasingly, enterprises are supporting "bring your own device" (BYOD) policies for employees whereby the employees use their personal mobile devices to connect to enterprise networks. By connecting to an enterprise network, employees can receive a desktop environment, embedded in a web browser or application executed by their personal mobile devices, that facilitates access to allowed enterprise web applications. In order to manage the mobile devices, compliance policies are established, and enforced by mobile application manager (MAM) devices, for example, that determine the web applications that are deployed or allowed, and security policies that are implemented and maintained for each of the mobile devices based on their characteristics (e.g., geographic location) or characteristics of the associated users (e.g., enterprise role).

Enrolled mobile devices and associated identified users can change characteristics over time. For example, a mobile device may be in an unsecured location at various times and employees may change roles or groups within an enterprise. Accordingly, enterprises periodically perform compliance checks to determine whether there has been any change to characteristics of the enrolled mobile devices or associated users that requires a change to deployed applications or security settings, for example. Enforcement of the compliance policy during the compliance check can result in identifying violations and marking associated mobile devices as out of compliance.

However, marking a mobile device as out of compliance generally results in denying access to enterprise resources, such as web applications, and associated downtime for a user. Additionally, the user may have to contact information technology services to determine how to regain compliance, and other overhead may result from marking a mobile device as being out of compliance. Unfortunately, there is currently no effective method for reducing the number of compliance violations, and associated mobile devices that are marked as out of compliance, or the resulting user downtime.

SUMMARY

A method for reducing compliance violations in mobile application management environments implemented by a network traffic management system comprising one or more compliance management apparatuses or server devices, the method including executing a compliance check to determine when a mobile device is out of compliance. A number of mobile devices that both are out of compliance based on the violation and share a characteristic with the one mobile device is determined, when the determining indicates that the mobile device is out of compliance. A determination is made when the number of the mobile devices exceeds a threshold. Contact data associated with one or more mobile devices that are in compliance and share the characteristic is obtained, when the determining indicates that the number of mobile devices exceeds the threshold. A notification is automatically sent, using the contact data, to each of the mobile devices that share the characteristic. The notification comprises an indication of the violation and one or more precautions.

A compliance management apparatus, comprising one or more comprising memory comprising programmed instructions stored thereon and one or more processors configured to be capable of executing the stored programmed instructions to execute a compliance check to determine when a mobile device is out of compliance. A number of mobile devices that both are out of compliance based on the violation and share a characteristic with the one mobile device is determined, when the determining indicates that the mobile device is out of compliance. A determination is made when the number of the mobile devices exceeds a threshold. Contact data associated with one or more mobile devices that are in compliance and share the characteristic is obtained, when the determining indicates that the number of mobile devices exceeds the threshold. A notification is automatically sent, using the contact data, to each of the mobile devices that share the characteristic. The notification comprises an indication of the violation and one or more precautions.

A non-transitory computer readable medium having stored thereon instructions for reducing compliance violations in mobile application management environments comprising executable code which when executed by one or more processors, causes the one or more processors to execute a compliance check to determine when a mobile device is out of compliance. A number of mobile devices that both are out of compliance based on the violation and share a characteristic with the one mobile device is determined, when the determining indicates that the mobile device is out of compliance. A determination is made when the number of the mobile devices exceeds a threshold. Contact data associated with one or more mobile devices that are in compliance and share the characteristic is obtained, when the determining indicates that the number of mobile devices exceeds the threshold. A notification is automatically sent, using the contact data, to each of the mobile devices that share the characteristic. The notification comprises an indication of the violation and one or more precautions.

A network traffic management system, comprising one or more compliance management apparatuses or server devices, the network traffic management system comprising memory comprising programmed instructions stored thereon and one or more processors configured to be capable of executing the stored programmed instructions to execute a compliance check to determine when a mobile device is out of compliance. A number of mobile devices that both are out of compliance based on the violation and share a characteristic with the one mobile device is determined, when the determining indicates that the mobile device is out of compliance. A determination is made when the number of the mobile devices exceeds a threshold. Contact data associated with one or more mobile devices that are in compliance and share the characteristic is obtained, when the determining indicates that the number of mobile devices exceeds the threshold. A notification is automatically sent, using the contact data, to each of the mobile devices that share the characteristic. The notification comprises an indication of the violation and one or more precautions.

This technology has a number of associated advantages including providing methods, non-transitory computer readable media, compliance management apparatuses, and network traffic management systems that facilitate reduced violations and associated downtime for enterprise network mobile device users. With this technology, compliance violations are monitored and increasing or trending violations are identified. Mobile devices that may be susceptible to the violations based on shared characteristics are advantageously identified and notified regarding the violations. Associated users can then preemptively take a suggested action in order to avoid violating the compliance policy, resulting in reduced user downtime and reduced utilization of information technology resources in order for mobile devices to regain compliance.

DETAILED DESCRIPTION

Figure 1:
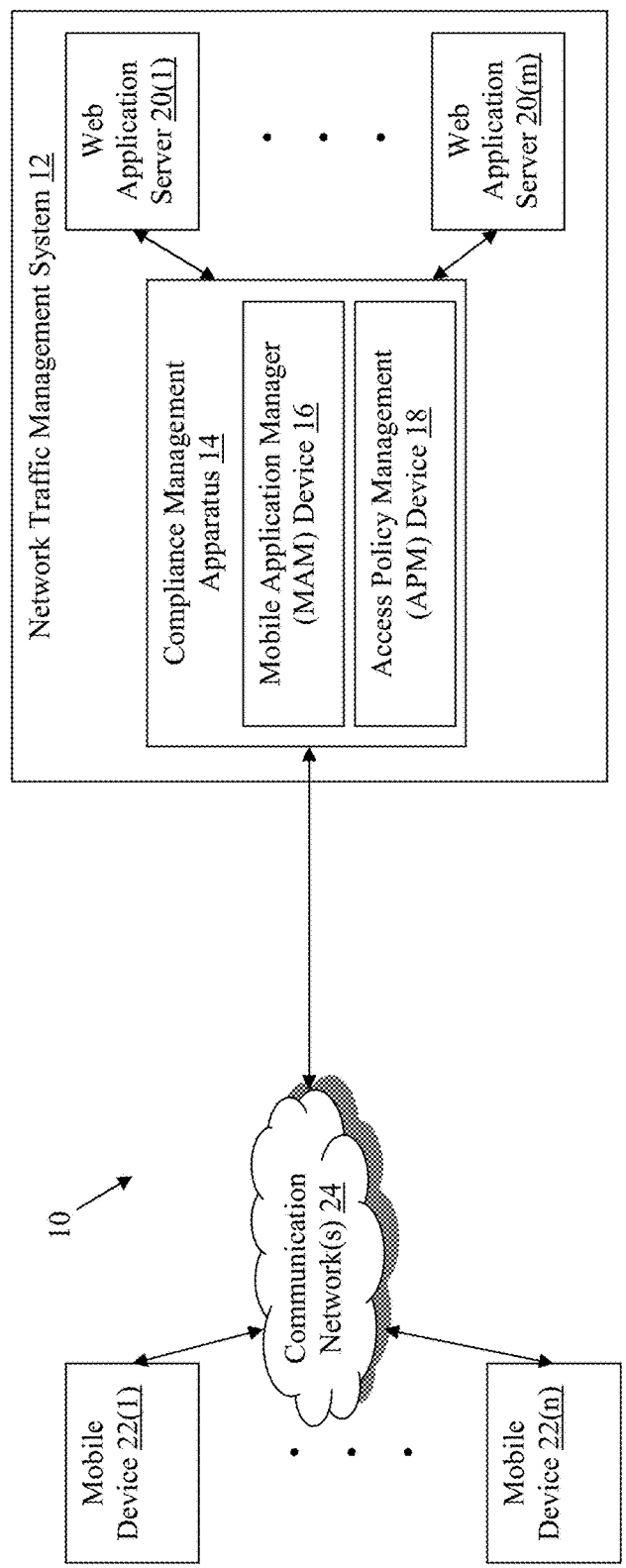
FIG. 1 is a system diagram of a network environment with an exemplary network traffic management system.

Referring to FIG. 1, an exemplary network environment 10, which incorporates an exemplary network traffic management system 12, is illustrated. The network traffic management system 12 in this example includes a compliance management apparatus 14, with a mobile application manager (MAM) device 16 and an access policy management (APM) device 18, which is coupled to a plurality of web application servers 20(1)-20(m). The compliance management apparatus 14 is coupled to a plurality of mobile devices 22(1)-22(n) via communication network(s) 24, although the compliance management apparatus, web application servers, and mobile devices may be coupled together via other topologies. Additionally, the network traffic management system 12 may include other network devices such as one or more routers and/or switches, for example, which are well known in the art and thus will not be described herein. This technology provides a number of advantages including providing methods, non-transitory computer readable media, compliance management apparatuses, and network traffic management systems that facilitate reduced compliance violations by mobile devices in enterprise networks.

Figure 2:
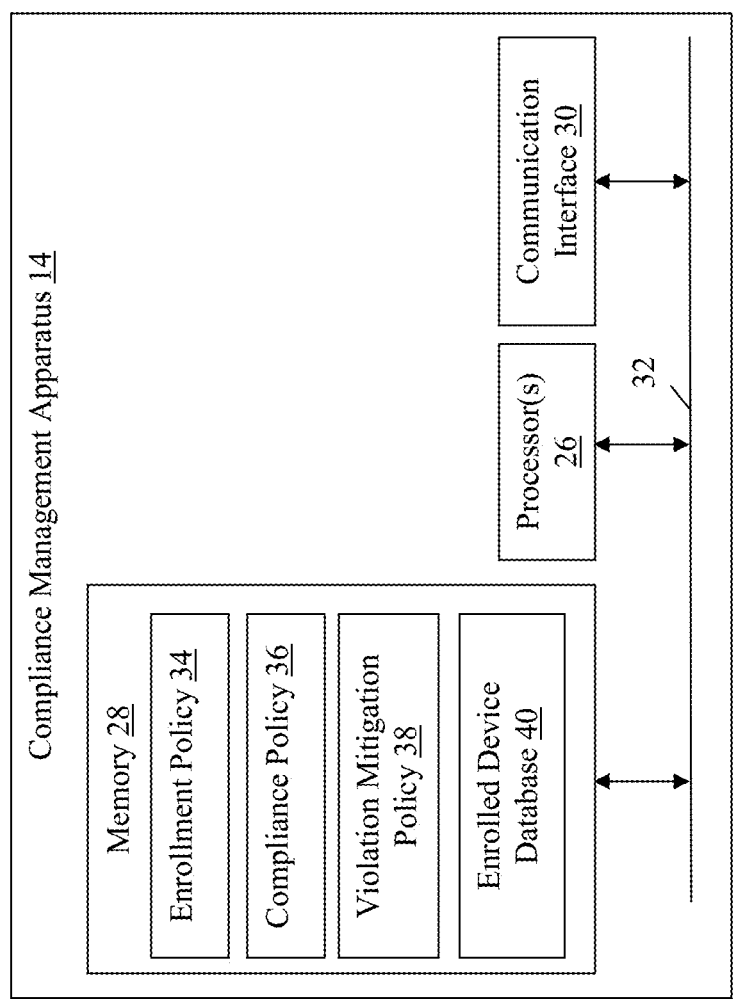
FIG. 2 is a block diagram of an exemplary compliance management apparatus of the network traffic management system shown in FIG. 1.

Referring to FIGS. 1-2, the compliance management apparatus 14 of the network traffic management system 12 may perform any number of functions including enrolling users of the mobile devices, controlling deployment of mobile applications on the mobile devices, managing security configurations of the mobile devices, or performing compliance checks on the mobile devices, for example. The compliance management apparatus 14 in this example includes the MAM device 16 and the APM device 18, although other devices can also be included in the compliance management apparatus 14 in other examples.

The APM device 18 in this example is primarily responsible for authenticating users of the mobile device 22(1)-22(n) and facilitating access to applications hosted by the web application servers 20(1)-20(m). The MAM device 16 in this example is primarily responsible for deploying applications and performing compliance checks, although the APM device 18 and/or MAM device 16 can perform other functions in other examples. Each of the MAM device 16 and the APM device 18 can share one or more hardware or software resources of the compliance management apparatus 14 and/or the MAM device 16 and/or APM device 18 can be located elsewhere in the network traffic management system 12 and optionally have one or more separate hardware or software resources in other examples.

The compliance management apparatus 14 in this example includes one or more processors 26, a memory 28, and/or a communication interface 30, which are coupled together by a bus 32 or other communication link, although the compliance management apparatus 14 can include other types and/or numbers of elements in other configurations. The processor(s) of the compliance management apparatus 14 may execute programmed instructions for the any number of the functions identified above. The processor(s) of the compliance management apparatus 14 may include one or more CPUs or general purpose processors with one or more processing cores, for example, although other types of processor(s) can also be used.

The memory 28 of the compliance management apparatus 14 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 28.

Figure 3:
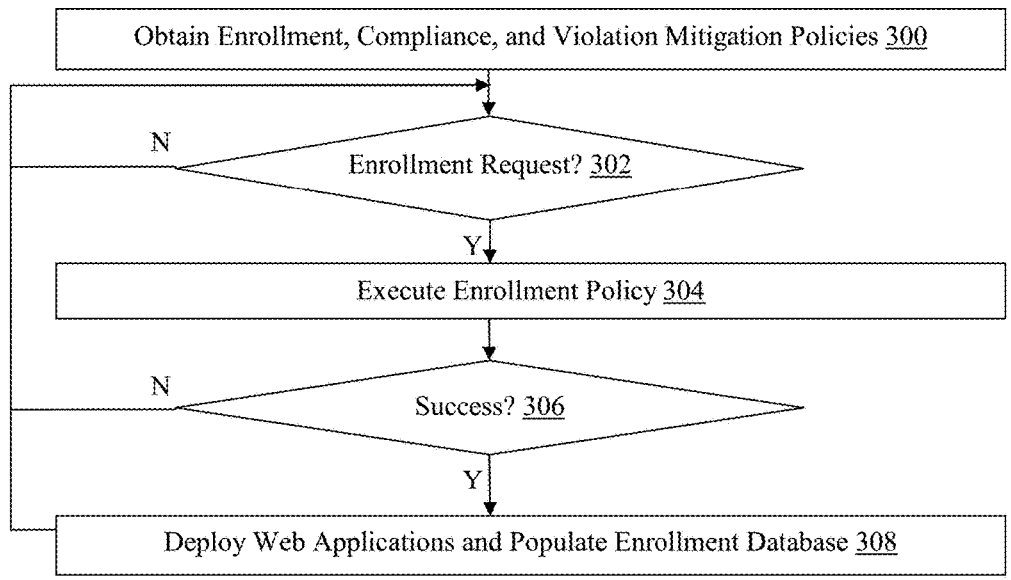
FIG. 3 is a flowchart of an exemplary method for enrolling mobile devices in mobile application management environments.

Accordingly, the memory of the compliance management apparatus 14 can store one or more applications that can include computer executable instructions that, when executed by the compliance management apparatus 14, cause the compliance management apparatus 14 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, modules, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the compliance management apparatus 14 itself, may be located in virtual server(s) running in a cloud-based computing environment rather than being tied to one or more specific physical network computing devices. Also, the application(s) may be running in one or more virtual machines (VMs) executing on the compliance management apparatus 14. Additionally, in one or more embodiments of this technology, virtual machine(s) running on the compliance management apparatus 14 may be managed or supervised by a hypervisor.

In this particular example, the memory 28 of the compliance management apparatus 14 includes at least one enrollment policy 34, at least one compliance policy 36, at least one violation mitigation policy 38, and an enrolled device database 40, although one or more of the policies 34, 36, and/or 38 could be combined and the memory 28 can include other policies, modules, databases, or applications, for example. One or more of the enrollment policy 34, compliance policy 36, and/or violation mitigation policy 38 can be established by an administrator and enforced by the compliance management apparatus 14. Accordingly, the compliance management apparatus 14 can execute the enrollment policy 34 in this example to authenticate users or the mobile devices 22(1)-22(n), deploy applications, and establish security configurations, for example.

In this example, the compliance management apparatus 14 can execute the compliance policy 36 upon enrollment or during a compliance check, for example, in order to determine whether one of the mobile devices 22(1)-22(n) complies with established enterprise policies regarding allowed applications and security configurations, for example. The compliance policy 36 in this example defines one or more mobile device configurations capable of being violated. The mobile device configurations can include allowed or blacklisted mobile applications, security settings, wireless network access settings, virtual private network settings, electronic mail settings, and/or licensing server registrations, for example.

The compliance management apparatus 14 can communicate with an active directory server or other enterprise database to determine whether a user role has changed or directly with one of the mobile devices 22(1)-22(n) to determine whether a blacklisted application has been installed or the one of the mobile devices 22(1)-22(n) has moved to an unsecure location, or security policies/settings on the one of the mobile devices 22(1)-22(n) have changed, for example. If the compliance management apparatus 14 identifies a violation based on execution of the compliance policy 36, then the associated one of the mobile devices 22(1)-22(n) can be marked as out of compliance, as described and illustrated in more detail later.

The violation mitigation policy 38 in this example can be executed by the compliance management apparatus 14 in order to determine whether notifications should be sent to one or more of the mobile devices 22(1)-22(n) based on identified violation(s) associated with other of the mobile devices 22(1)-22(n). The notifications can identify the violation of the compliance policy 36 that resulted in the other of the mobile devices 22(1)-22(n) being marked as out of compliance to facilitate avoidance by the users of the one or more of the mobile devices 22(1)-22(n) of the activity that resulted in the violation, as described and illustrated in more detail later. Accordingly, the violation mitigation policy 38 can include thresholds that indicate a number or percentage of the mobile devices 22(1)-22(n) required to be marked as out of compliance and associated with a certain characteristic in order for the compliance management apparatus 14 to send a notification.

For example, the violation mitigation policy 38 can indicate a threshold as 50% of the mobile devices 22(1)-22(n) running an iOS operating system. In this example, when more than 50% of the mobile devices 22(1)-22(n) running an iOS operating system are marked as out of compliance based on a certain violation of the compliance policy 36, the threshold can be triggered resulting in the compliance management apparatus 14 automatically sending a notification identifying the violation (e.g., to at least the remaining ones of the mobile devices 22(1)-22(n) running an iOS operating system and not currently marked as out of compliance). Other types of thresholds, mobile device characteristics, and/or provisions can be included in the violation mitigation policy 38, as described and illustrated in more detail later.

The enrolled device database 40 in this example can include characteristic data regarding enrolled ones of the mobile devices 22(1)-22(n), whether the mobile devices 22(1)-22(n) are marked as out of compliance, or when the last compliance check has been performed for each of the mobile devices 22(1)-22(n), for example. The characteristic data can include a user group, a user role, a device type, a device operating system type, a standalone application type, a current location, a security level of a prior location during a most recent compliance check, or an indication of whether the compliance check has been performed since enrollment, for example, although other types and numbers of characteristic data can also be stored in the enrolled device database 40. The characteristic data can be retrieved from the mobile devices 22(1)-22(n) or an active directory server, for example, and can be used by the compliance management apparatus 14 in the execution of one or more of the enrollment policy 34, compliance policy 36, or violation mitigation policy 38, as described and illustrated in more detail later.

The communication interface 30 of the compliance management apparatus 14 operatively couples and communicates between the compliance management apparatus 14, the web application servers 20(1)-20(m), and/or the mobile devices 22(1)-22(n), which are coupled together by the communication network(s) 24, although other types and/or numbers of communication networks or systems with other types and/or numbers of connections and/or configurations to other devices and/or elements can also be used.

By way of example only, the communication network(s) 24 can include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) can also include direct connection(s) (e.g., for when a device illustrated in FIG. 1, such as the compliance management apparatus 14, the web application servers 20(1)-20(m), and/or the mobile devices 22(1)-22(n), operate as virtual instances on the same physical machine).

While the compliance management apparatus 14 is illustrated in this example as including a single device, the compliance management apparatus 14 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the compliance management apparatus 14.

Additionally, one or more of the devices that together comprise the compliance management apparatus 14 in other examples can be standalone devices or integrated with one or more other devices or apparatuses, such as the web application servers 20(1)-20(m), for example. Moreover, one or more of the devices of the compliance management apparatus 14 in these examples can be in a same or a different communication network including one or more public, private, or cloud networks, for example.

Each of the web application servers 20(1)-20(m) of the network traffic management system 12 in this example includes one or more processors, a memory, and a communication interface, which are coupled together by a bus or other communication link, although other numbers and/or types of network devices could be used. The web application servers 20(1)-20(m) process requests received from the mobile devices via the communication network(s) according to the HTTP-based application RFC protocol, for example. Various backend web applications may be operating on the web application servers 20(1)-20(m) and transmitting data (e.g., files or Web pages) to the mobile devices 22(1)-22(n) via the compliance management apparatus 14 in response to requests from the mobile devices 22(1)-22(n). The web application servers 20(1)-20(m) may be hardware or software or may represent a system with multiple servers in a pool, which may include internal or external networks.

Although the web application servers 20(1)-20(m) are illustrated as single devices, one or more actions of each of the web application servers 20(1)-20(m) may be distributed across one or more distinct network computing devices that together comprise one or more of the web application servers 20(1)-20(m). Moreover, the web application servers 20(1)-20(m) are not limited to a particular configuration. Thus, the web application servers 20(1)-20(m) may contain a plurality of network computing devices that operate using a master/slave approach, whereby one of the network computing devices of the web application servers 20(1)-20(m) operate to manage and/or otherwise coordinate operations of the other network computing devices. The web application servers 20(1)-20(m) may operate as a plurality of network computing devices within a cluster architecture, a peer-to-peer architecture, virtual machines, or within a cloud architecture, for example.

Thus, the technology disclosed herein is not to be construed as being limited to a single environment and other configurations and architectures are also envisaged. For example, one or more of the web application servers 20(1)-20(m) can operate within the compliance management apparatus 14 itself rather than as a standalone web application server. In this example, the one or more web application servers 20(1)-20(m) operate within the memory 28 of the compliance management apparatus 14.

The mobile devices 22(1)-22(n) can include any type of computing device that can receive, render, and facilitate user interaction with a webtop, such as mobile computing devices, laptop computing devices, or tablet computing devices, virtual machines (including cloud-based computers), or the like. Each of the mobile devices 22(1)-22(n) in this example includes a processor, a memory, and a communication interface, which are coupled together by a bus or other communication link, although other numbers and types of network devices could be used.

The mobile devices 22(1)-22(n) may run interface applications, such as standard Web browsers or standalone mobile applications, which may provide an interface to make requests for, and receive content stored on, one or more of the web application servers 20(1)-20(m) via the communication network(s) 24. The mobile devices 22(1)-22(n) may further include a display device, such as a display screen or touchscreen, and/or an input device, such as a keyboard for example.

Although the exemplary network environment 10 with the compliance management apparatus 14, web application servers 20(1)-20(m), mobile devices 22(1)-22(n), and communication network(s) 24 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the compliance management apparatus 14 or web application servers 20(1)-20(m), for example, may be configured to operate as virtual instances on the same physical machine. In other words, one or more of the compliance management apparatus 14 web application servers 20(1)-20(m) illustrated in FIG. 1 may operate on the same physical device rather than as separate devices communicating through a network as depicted in FIG. 1. There may be more or fewer compliance management apparatuses, mobile devices, and/or web application servers than depicted in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein, which when executed by one or more processors, cause the processors to carry out the steps necessary to implement the methods of the example of this technology that are described and illustrated herein.

An exemplary method of reducing compliance violations in mobile application management environments will now be described with reference to FIGS. 1-5. Referring more specifically to FIG. 3, a method for enrolling mobile devices in a mobile application management environment is illustrated. In step 300 in this example, the compliance management apparatus 14 of the network traffic management system 12 obtains the enrollment policy 34, compliance policy 36, and violation mitigation policy 38 via an administrator interface, and stores the policies in the memory 28.

In step 302, the compliance management apparatus 14 of the network traffic management system 12 determines whether an enrollment request to register as part of the enterprise network has been received from one of the mobile devices 22(1)-22(n). In this example, the enrollment request can include user credentials of the user of the one of the mobile devices 22(1)-22(n), although the compliance management apparatus 14 can also receive other types of information from the one of the mobile devices 22(1)-22(n), such as the type of the one of the mobile devices 22(1)-22(n), user group information associated with the user of the one of the mobile devices 22(1)-22(n), a geographic location of the one of the mobile devices 22(1)-22(n), or the IP address of the one of the mobile devices 22(1)-22(n), for example.

Accordingly, if the compliance management apparatus 14 determines that an enrollment request has not been received, then the No branch is taken back to step 302 and the compliance management apparatus 14 effectively waits for an enrollment request to be received from one of the mobile devices 22(1)-22(n). However, if the compliance management apparatus 14 determines that an enrollment request has been received from one of the mobile devices 22(1)-22(n), then the Yes branch is taken to step 304.

In step 304, the compliance management apparatus 14 of the network traffic management system 12 executes the enrollment policy 34 on the one of the mobile devices 22(1)-22(n). In this example, the enrollment policy 34 includes one or more rules that assist the compliance management apparatus 14 to determine whether the one of the mobile devices 22(1)-22(n) is allowed to be register with the enterprise network, although the enrollment policy 34 can include other types or amounts of information or access rules. Accordingly, the enrollment policy 34 can include guidelines to validate the user credentials and other information associated with the requesting one of the mobile devices 22(1)-22(n).

In step 306, the compliance management apparatus 14 of the network traffic management system 12 determines whether the enrollment of the one of the mobile devices 22(1)-22(n) was successful based on the execution of the enrollment policy 34 for the one of the mobile devices 22(1)-22(n). If the compliance management apparatus 14 determines that the enrollment was not successful, then the No branch is taken back to step 302. However, if the compliance management apparatus 14 determines that the enrollment of the one of the mobile devices 22(1)-22(n) was successful, then the Yes branch is taken to step 308.

In step 308, the compliance management apparatus 14 of the network traffic management system 12 enrolls the one of the mobile devices 22(1)-22(n) by deploying mobile applications and security policies on the mobile devices 22(1)-22(n) based on the compliance policy settings, and populating the enrollment database 40 with obtained characteristic data associated with the one of the mobile devices 22(1)-22(n). In one example, upon enrolling the one of the mobile devices 22(1)-22(n), the compliance management apparatus 14 executes the compliance policy 36 on the one of the mobile devices 22(1)-22(n).

In this example, the compliance policy 36 checks the device settings, user settings, installed mobile applications, and/or security configurations on the one of the mobile devices 22(1)-22(n), although the compliance policy can perform other types and/or numbers of checks on the one of the mobile devices 22(1)-22(n). Accordingly, based on the execution of the compliance policy for the one of the mobile devices 22(1)-22(n), the compliance management apparatus 14 determines whether mobile application(s) are required to be installed on, or uninstalled from, the one of the mobile devices 22(1)-22(n) or whether security settings of the one of the mobile devices 22(1)-22(n) are required to be modified, for example.

The compliance management apparatus 14 in this example also obtains and stores characteristic data in the enrolled device database. The characteristic data can be sent by, or retrieved from, the one of the mobile devices 22(1)-22(n), via one or more queries to an active directory server associated with the enterprise, or obtained from one or more other sources, for example. The characteristic data can be used to evaluate the compliance policy in step 308 and to monitor the state of the mobile application management environment of the enterprise network, for example, as well as to evaluate the violation mitigation policy 38, as described and illustrated in more detail below.

Accordingly, the characteristic data in this example can include a user group, a user role, a device type, a device operating system type, a type of standalone application for facilitating execution of a webtop, or a current location, for example. The type can include a version or any other characteristic of a web browser, operating system, or standalone application of the one of the mobile devices 22(1)-22 (n), for example. The number and type of installed mobile applications, a security level of a prior location during a most recent compliance check, an indication of whether a compliance check has been performed since enrollment, or other types and numbers of characteristic data, can also be obtained during or subsequent to enrollment of the one of the mobile devices 22(1)-22(n) and stored in the enrolled device database 40. In other examples, other types and numbers of characteristic data for the one of the mobile devices 22(1)-22(n) can also be obtained or stored in the enrolled device database 40 by the compliance management apparatus 14.

Figure 4:
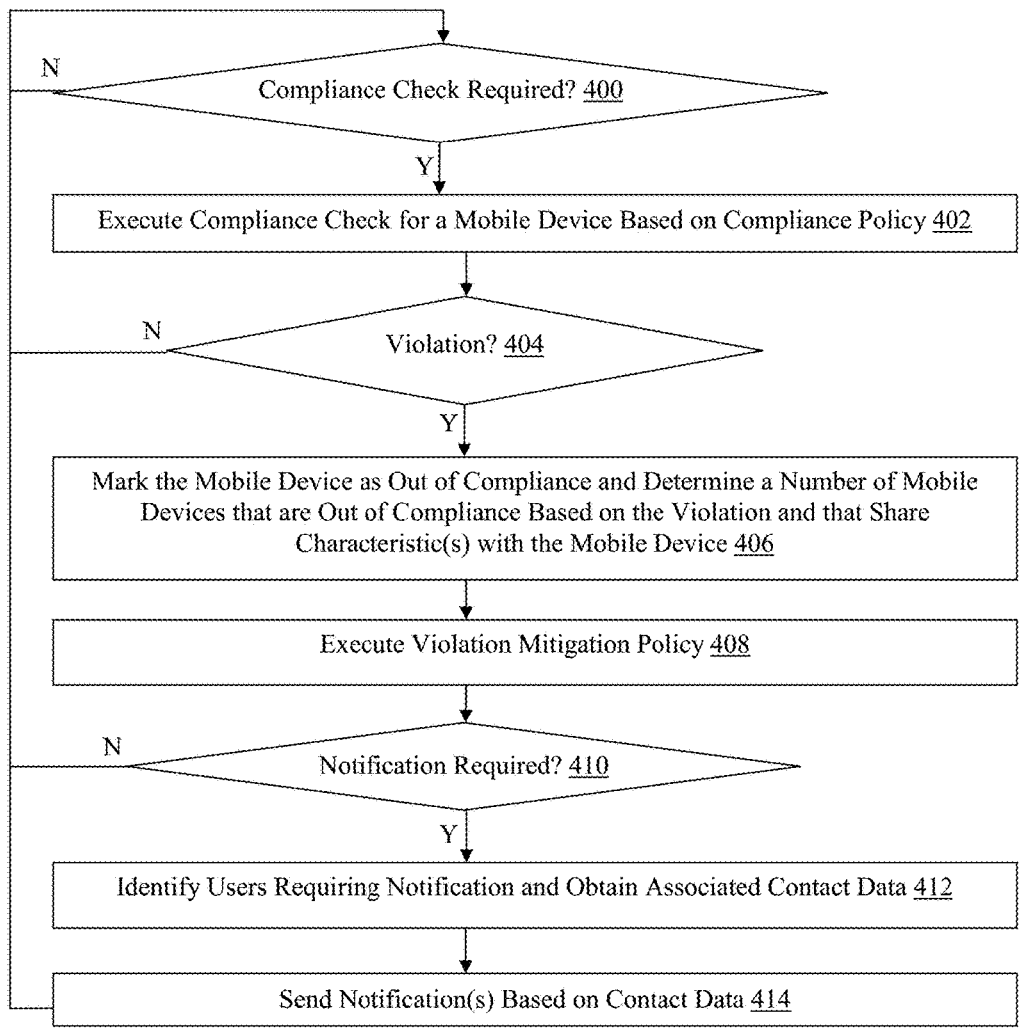
FIG. 4 is a flowchart of an exemplary method for reducing compliance violations in mobile application management environments.

Referring more specifically to FIG. 4, a method for reducing compliance violations in mobile application management environments is illustrated. In some examples, the methods illustrated in FIGS. 3 and 4 can be carried out in parallel by the compliance management apparatus 14, although the methods can be executed in other manners. In these examples, the compliance management apparatus 14 can enroll one or more of the mobile devices 22(1)-22(n), as described and illustrated earlier with reference to FIG. 3, while concurrently carrying out compliance checks and reducing compliance violations, as will be described and illustrated now with reference to FIG. 4.

Accordingly, in step 400 in this example, the compliance management apparatus 14 of the network traffic management system 12 determines whether a compliance check should be initiated for one of the mobile devices 22(1)-22(n). In this example, the compliance management apparatus 14 stores the time at which a most recent periodic or administrator-initiated compliance check has occurred for each of the mobile devices 22(1)-22(n) in the enrolled device database 40. Accordingly, the compliance management apparatus 14 can determine whether to initiate a compliance check for one of the mobile devices 22(1)-22(n) based on whether a periodic time period has expired for the one of the mobile devices 22(1)-22(n), based on the stored time of the most recent compliance check, although other types of established time periods can be used.

The periodic time period can be established by an administrator via a provided administrator interface, for example. Although configurable, administrators often establish a periodic time period on the order of several hours for initiating compliance checks for enrolled mobile devices 22(1)-22(n). Other methods of initiating a compliance check for one of the mobile devices 22(1)-22(n) can also be used in other examples. If the compliance management apparatus 14 determines that a compliance check should not be initiated for any of the mobile devices 22(1)-22(n), then the No branch is taken back to step 400 and the compliance management apparatus 14 effectively waits until a determination is made that a compliance check should be initiated for one of the mobile devices 22(1)-22(n). Accordingly, when the compliance management apparatus 14 determines that a compliance check should be initiated for one of the mobile devices 22(1)-22(n), then the Yes branch is taken to step 502.

In step 402, the compliance management apparatus 14 of the network traffic management system 12 executes the compliance check for one of the mobile devices 22(1)-22(n) using the compliance policy 36. The compliance management apparatus 14 can evaluate the compliance policy 36 for the one of the mobile devices 22(1)-22(n), as described and illustrated earlier with reference to step 308 of FIG. 3 in which the compliance policy 36 is evaluated subsequent to enrollment. In order to carry out the compliance check, the compliance management apparatus 14 can obtain updated characteristic data for the one of the mobile devices 22(1)-22(n), as described and illustrated earlier with reference to step 308 of FIG. 3.

In some examples, the compliance management apparatus 14 can retrieve a list of currently-installed mobile applications from the one of the mobile devices 22(1)-22(n), obtain a current geographic location of the one of the mobile devices 22(1)-22(n), or obtain a user role from an active directory server for a user of the one of the mobile devices 22(1)-22(n), for example. The compliance management apparatus 14 can then evaluate the compliance policy 25 based on the updated characteristic data, as well as store the updated characteristic data in the enrolled device database 40. Additionally, the compliance management apparatus 14 can update the enrolled device database 40 to include temporal data regarding the performance of the compliance check.

The compliance management apparatus 14 can then determine whether the one of the mobile devices 22(1)-22(n) is still in compliance with the compliance policy 36 or whether the one of the mobile devices 22(1)-22(n) is in violation of the compliance policy 36. A violation can result from installing a blacklisted application or changing a security setting, for example, subsequent to a prior compliance check, although violations can result from any other kind of activity reflected in the updated characteristic data that is evaluated by the compliance management apparatus 14 based on the compliance policy 36.

In step 404, the compliance management apparatus 14 of the network traffic management system 12 determines whether the one of the mobile devices 22(1)-22(n) has violated the compliance policy 25, as well as an indication of the violation(s) (e.g., installation of a specific blacklisted application). If the compliance management apparatus 14 determines that the one of the mobile devices 22(1)-22(n) has not violated the compliance policy 36, then the No branch is taken back to step 400 and the compliance management apparatus 14 determines whether a compliance check is currently required for another one of the mobile devices 22(1)-22(n). However, if the compliance management apparatus 14 determines that the one of the mobile devices 22(1)-22(n) has violated the compliance policy 36, then the Yes branch is taken to step 406.

In step 406, the compliance management apparatus 14 of the network traffic management system 12 marks the one of the mobile devices 22(1)-22(n) as out of compliance in the enrolled device database 40 and determines a number of the mobile devices 22(1)-22(n) that are both out of compliance based on the same violation as the one of the mobile devices 22(1)-22(n) and share a characteristic with the one of the mobile devices 22(1)-22(n). The number of the mobile devices 22(1)-22(n) that are out of compliance can include the number of the mobile devices 22(1)-22(n) currently marked in the enrolled device database 40 as being out of compliance or the number of the mobile devices 22(1)-22(n) marked as out of compliance within an established trailing time period, for example. In this example, the compliance management apparatus 14 can store an indication of the violation in the enrolled device database 40 as associated with each of the mobile devices 22(1)-22(n) marked as out of compliance.

Accordingly, in one example the compliance management apparatus 14 can identify the number of the mobile devices 22(1)-22(n) that are currently marked as out of compliance in the enrolled device database 40 for violating the compliance policy 36 based on installing a specific blacklisted application and that share the characteristic of having the same user role of a manager within the enterprise. Other types of violations and/or characteristics can also be used in other examples. In addition to user role, the shared characteristic can by way of example only include a user group, a mobile device type, a mobile device operating system type, a standalone application type, a location, or any other type of characteristic data stored in the enrolled device database 40.

In step 408, the compliance management apparatus 14 of the network traffic management system 12 executes the violation mitigation policy 38 to determine when the number of the mobile devices 22(1)-22(n) determined in step 406 exceeds a threshold. Accordingly, the violation mitigation policy 38 can indicate any number of rules that, when evaluated by the compliance management apparatus 14, determine when a notification should be sent to one or more of the mobile devices 22(1)-22(n) in an effort to reduce future violation, as explained in more detail later. The rules can include thresholds such that exceeding a threshold automatically triggers sending by the compliance management apparatus 14 of the notifications. The thresholds specified in the violation mitigation policy 38 can be based on a static or dynamic number, a percentage of mobile devices 22(1)-22(n) associated with a same characteristic in the enrolled device database 40, or any other values.

In step 410, the compliance management apparatus 14 of the network traffic management system 12 determines whether a notification is required based on the execution of the violation mitigation policy 38. Accordingly, in the example described earlier, if the number of the mobile devices 22(1)-22(n) determined in step 406 exceeds sixty percent of the total number of enrolled ones of the mobile devices 22(1)-22(n) having associated characteristic data in the enrolled device database 40 indicating that the corresponding user is a manager (as specified in the violation mitigation policy 38), then the compliance management apparatus 14 would determine in step 410 that a notification is required based on the evaluation of the violation mitigation policy 38.

In this example, a relatively high and increasing number of managers in the enterprise are installing a specific blacklisted application, and their associated ones of the mobile devices 22(1)-22(n) are therefore being marked as out of compliance, resulting in downtime for the managers. Any other types and numbers of provisions or rules can be included in the violation mitigation policy 38 in other examples. Accordingly, if the compliance management apparatus 14 determines in step 410 that a notification is not required based on the execution of the violation mitigation policy 38, then the No branch is taken back to step 400. However, if the compliance management apparatus 14 determines that a notification is required, then the Yes branch is taken to step 412.

In step 412, the compliance management apparatus 14 of the network traffic management system 12 identifies one or more users requiring a notification. In one example, the compliance management apparatus 14 can obtain contact data from an active directory server associated with the enterprise, or as previously stored in the enrolled device database 40, for example, for one or more of the mobile devices 22(1)-22(n) that share one or more characteristics associated with the provision of the violation mitigation policy 38 that triggered the notification. The contact data can include contact information such as an e-mail address, a cellular telephone number capable of receiving SMS messages, or identifying information for one of the mobile devices 22(1)-22(n) or an application executing on one of the mobile devices 22(1)-22(n) to which a notification can be pushed, for example, although other types of contact data can also be used.

Accordingly, in the example described earlier, the compliance management apparatus 14 can obtain an e-mail address from an active director server for each user of one of the mobile devices 22(1)-22(n) having associated characteristic data in the enrolled device database 40 indicating a manager user role. Optionally, the contact data can be obtained for only those of the mobile devices 22(1)-22(n) that share the one or more characteristics, but are not currently marked as out of compliance in the enrolled device database 40. Accordingly, in this example, the compliance management apparatus 14 can optionally obtain contact data for only the managers associated with those of the mobile devices 22(1)-22(n) that are not currently marked as out of compliance in the enrolled device database 40.

In step 414, the compliance management apparatus 14 of the network traffic management system 12 automatically sends a notification based on the contact data obtained in step 412. Optionally, the notification comprises an indication of the violation associated with the provision of the violation mitigation policy 38 that triggered the notification. In the example described earlier, the compliance management apparatus 14 can automatically send an e-mail to users of each of the mobile devices 22(1)-22(n) not marked in the enrolled device database 40 as out of compliance and having associated characteristic data in the enrolled device database 40 indicating a manager user role.

The notification can indicate that compliance violations for managers based on installation of the specific blacklisted application are increasing, thereby allowing the managers associated with ones of the mobile devices 22(1)-22(n) not currently marked as out of compliance in the enrolled device database 40 to avoid taking an action (e.g., installing the specific blacklisted application) that may result in their associated ones of the mobile devices 22(1)-22(n) also being marked as out of compliance. By reducing the number of subsequent violations, fewer of the mobile devices 22(1)-22(n) can be marked as out of compliance resulting in reduced downtime for enterprise users.

Figure 5:
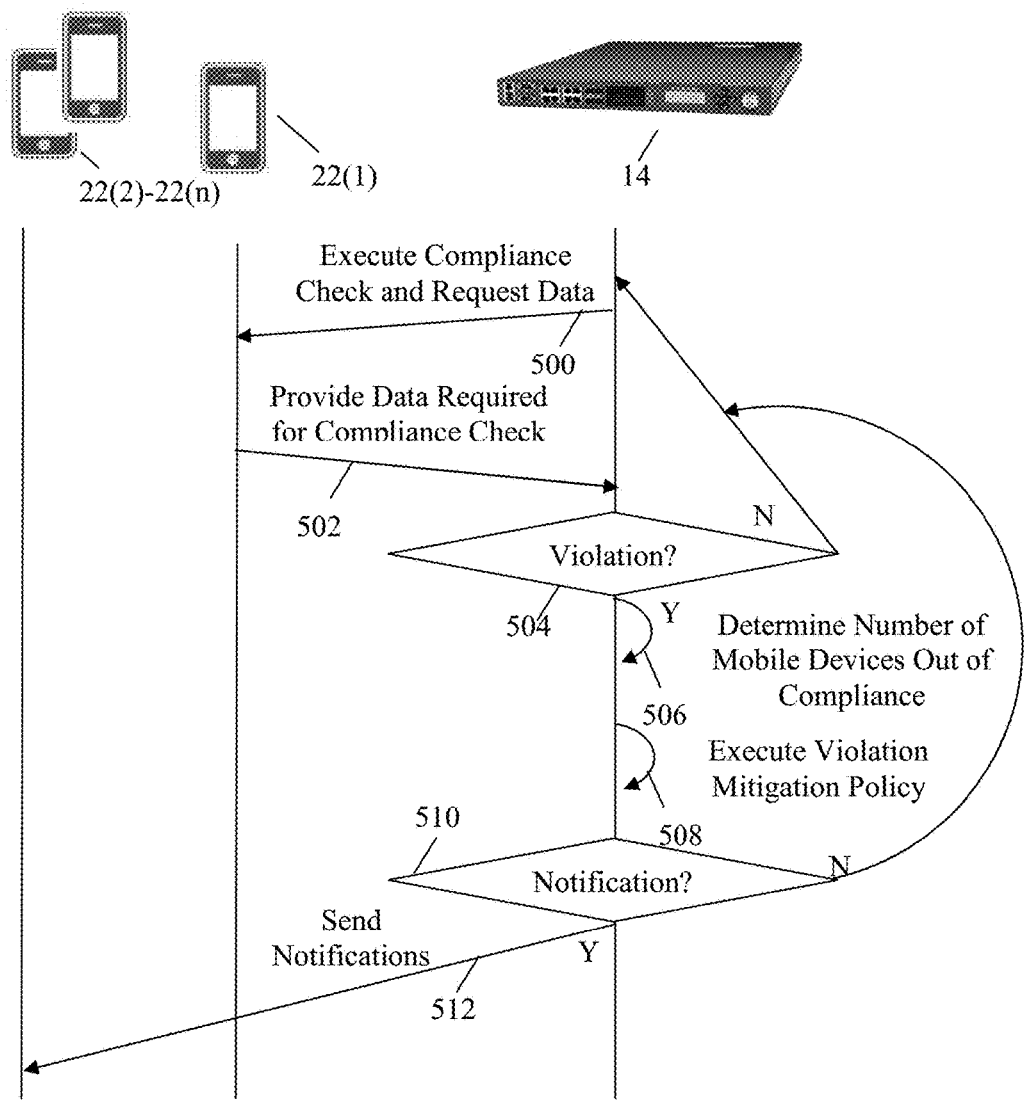
FIG. 5 is a timing diagram illustrating an exemplary method for reducing compliance violations in mobile application management environments.

Referring more specifically to FIG. 5, a timing diagram illustrating a method for reducing compliance violations in mobile application management environments is shown. In step 500 in this example, the compliance management apparatus 14 executes a compliance check for a mobile device 22(1) and requests characteristic data from the mobile device 22(1), such as currently-installed mobile applications and/or current security configurations, for example.

In step 502, the mobile device 22(1) provides the characteristic data requested by the compliance management apparatus 14 for the compliance check. Additional characteristic data can be obtained from active directory server(s) and/or other source(s) in other examples.

In step 504, the compliance management apparatus 14 determines whether the mobile device 22(1) is in violation of a stored compliance policy 36 based on the obtained characteristic data. If the compliance management apparatus 14 determines that the mobile device 22(1) does not violate the compliance policy 36, then the No branch is taken back to step 500. However, if the compliance management apparatus 14 determines that the mobile device 22(1) does violate the compliance policy 36, then the Yes branch is taken to step 506.

In step 506, the compliance management apparatus 14 determines a number of other mobile devices 22(2)-22(n) that are currently out of compliance and that share at least a portion of characteristic data with the mobile device 22(1).

In step 508, the compliance management apparatus 14 executes a violation mitigation policy 38 to determine whether the number of other mobile devices 22(2)-22(n) determined in step 506 exceeds a threshold.

In step 510, the compliance management apparatus 14 determines whether a notification is required based on the execution of the violation mitigation policy 38. If the compliance management apparatus 14 determines that a notification is not required, then the No branch is taken back to step 500. However, if the compliance management apparatus 14 determines in step 510 that a notification is required because the number of other mobile devices 22(2)-22(n) exceeds a threshold based on the violation mitigation policy, then the Yes branch is taken to step 512.

In step 512, the compliance management apparatus 14 obtains contact data associated with one or more of the other mobile devices 22(2)-22(n) that share the characteristic data associated with a provision of the violation mitigation policy 38 that triggered the notification. Based on the contact data, the compliance management apparatus 14 sends a notification to the one or more other mobile devices 22(2)-22(n).

Optionally, the notification includes an indication of the violation of the compliance policy 36 determined in step 504, which allows users of the one or more other of the mobile devices 22(2)-22(n) to avoid activity that may result in the violation. Since the notified users share the characteristic data, in some examples, the notified users may be most susceptible of all of the enterprise users to performing the activity that resulted in the violation. Also optionally, the notification can include one or more precautions to be taken in order to maintain compliance, such as not installing certain mobile applications or not making certain security or other setting changes for example, although any other type of precaution can also be included in the notification.

With this technology, compliance of mobile devices with an established policy is monitored periodically via compliance checks. Advantageously, trending compliance violations can be identified based on the monitoring, and subsequent corresponding violations by other mobile devices can be reduced based on preemptive and informative notifications. By reducing compliance violations, this technology also reduces user downtime due to associated devices being marked as out of compliance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for reducing compliance violations in mobile application management environments implemented by a network traffic management system comprising one or more compliance management apparatuses or server devices, the method comprising:

executing a compliance check to determine that a first computing device is out of compliance based on a violation of a compliance policy;

in response to determining that the first computing device is out of compliance, determining a number of non-compliant computing devices that both are out of compliance based on the violation of the compliance policy and share a same characteristic with the first computing device;

determining that the number of non-compliant computing devices exceeds a threshold;

in response to determining that the number of the non-compliant computing devices exceeds the threshold, automatically sending a notification to at least a second computing device that shares the same characteristic with the first computing device, wherein the notification comprises an indication of one or more precautions to be taken in order to maintain compliance.

2. The method of claim 1, wherein the at least the second computing device is currently in compliance based on the compliance policy or not in compliance based on the violation of the compliance policy.

3. The method of claim 1, wherein the determining that a number of non-compliant computing devices that share the same characteristic exceeds a threshold further comprises:

evaluating a violation mitigation policy to determine whether the threshold has been exceeded, the violation mitigation policy defining the threshold.

4. The method of claim 1, wherein the compliance policy defines one or more computing device configurations capable of being violated, the one or more computing device configurations comprising one or more allowed or blacklisted computing applications, security settings, wireless network access settings, virtual private network settings, electronic mail settings, or licensing server registrations.

5. The method of claim 1, wherein the same characteristic comprises one or more of a user group, a user role, a computing device type, a computing device operating system type, a standalone application type, or a location.

6. A compliance management apparatus, comprising memory comprising programmed instructions stored thereon and one or more processors configured to be capable of executing the stored programmed instructions to:

execute a compliance check to determine that a first computing device is out of compliance based on a violation of a compliance policy;

in response to determining that the first computing device is out of compliance, determine a number of non-compliant computing devices that both are out of compliance based on the violation of the compliance policy and share a same characteristic with the first computing device;

determine that the number of non-compliant computing devices exceeds a threshold;

in response to determining that the number of non-compliant computing devices exceeds the threshold, automatically send a notification to at least a second computing device that shares the same characteristic with the first computing device, wherein the notification comprises an indication of one or more precautions to be taken in order to maintain compliance.

7. The compliance management apparatus of claim 6, wherein the at least the second computing device is currently in compliance based on the compliance policy or not in compliance based on the violation of the compliance policy.

8. The compliance management apparatus of claim 6, wherein the determining that the number of non-compliant computing devices that share the same characteristic exceeds a threshold further comprises:

evaluating a violation mitigation policy to determine whether the threshold has been exceeded, the violation mitigation policy defining the threshold.

9. The compliance management apparatus of claim 6, wherein the compliance policy defines one or more computing device configurations capable of being violated, the one or more computing device configurations comprising one or more allowed or blacklisted computing applications, security settings, wireless network access settings, virtual private network settings, electronic mail settings, or licensing server registrations.

10. The compliance management apparatus of claim 6, wherein the same characteristic comprises one or more of a user group, a user role, a computing device type, a computing device operating system type, a standalone application type, or a location.

11. A non-transitory computer readable medium having stored thereon instructions for reducing compliance violations in mobile application management environments comprising executable code which when executed by one or more processors, causes the one or more processors to:

execute a compliance check to determine that a first computing device is out of compliance based on a violation of a compliance policy;

in response to determining that the first computing device is violating the compliance policy, determine a number of non-compliant computing devices that both are out of compliance based on the violation of the compliance policy and share a same characteristic with the first computing device;

determine that the number of non-compliant computing devices exceeds a threshold;

in response to determining that the number of non-compliant computing devices exceeds the threshold, automatically send a notification to at least a second computing device that shares the same characteristic with the first computing device, wherein the notification comprises an indication of one or more precautions to be taken in order to maintain compliance.

12. The non-transitory computer readable medium of claim 11, wherein the at least the second computing device is currently in compliance based on the compliance policy or not in compliance based on the violation of the compliance policy.

13. The non-transitory computer readable medium of claim 11, wherein the determining that the number of non-compliant computing devices that share the same characteristic exceeds a threshold further comprises:

evaluating a violation mitigation policy to determine whether the threshold has been exceeded, the violation mitigation policy defining the threshold.

14. The non-transitory computer readable medium of claim 11, wherein the compliance policy defines one or more computing device configurations capable of being violated, the one or more computing device configurations comprising one or more allowed or blacklisted computing applications, security settings, wireless network access settings, virtual private network settings, electronic mail settings, or licensing server registrations.

15. The non-transitory computer readable medium of claim 11, wherein the characteristic comprises one or more of a user group, a user role, a computing device type, a computing device operating system type, a standalone application type, or a location.

16. A network traffic management system, comprising one or more compliance management apparatuses or server devices, the network traffic management system comprising memory comprising programmed instructions stored thereon and one or more processors configured to be capable of executing the stored programmed instructions to:
   execute a compliance check to determine that a first computing device is out of compliance based on a violation of a compliance policy;
   in response to determining that the first computing device is out of compliance, determine a number of non-compliant computing devices that both are out of compliance based on the violation of the compliance policy and that share a same characteristic with the first computing device;
   determine that the number of non-compliant computing devices exceeds a threshold;
   in response to determining that the number of non-compliant computing devices exceeds the threshold, automatically send a notification to at least a second computing device that shares the same characteristic with the first computing device, wherein the notification comprises an indication of one or more precautions to be taken in order to maintain compliance.

17. The network traffic management system of claim 16, wherein the at least the second computing device is currently in compliance based on the compliance policy or not in compliance based on the violation of the compliance policy.

18. The network traffic management system of claim 16, wherein the determining that the number of non-compliant computing devices that share the same characteristic exceeds a threshold further comprises:
   evaluating a violation mitigation policy to determine whether the threshold has been exceeded, the violation mitigation policy defining the threshold.

19. The network traffic management system of claim 16, wherein the compliance policy defines one or more computing device configurations capable of being violated, the one or more computing device configurations comprising one or more allowed or blacklisted applications, security settings, wireless network access settings, virtual private network settings, electronic mail settings, or licensing server registrations.

20. The network traffic management system of claim 16, wherein the characteristic comprises a user group, a user role, a computing device type, a computing device operating system type, a standalone application type, or a location.

21. The method of claim 1, wherein the first computing device and the at least one second computing device comprise mobile devices.

22. The apparatus of claim 6, wherein the first computing device and the at least one second computing device comprise mobile devices.

23. The non-transitory computer readable medium of claim 11, wherein the first computing device and the at least one second computing device comprise mobile devices.

24. The network traffic management system of claim 16, wherein the first computing device and the at least one second computing device comprise mobile devices.

25. The network traffic management system of claim 16, wherein the one or more processors comprise one or more hardware processors.

* * * * *